United States Patent [19]
Kim et al.

[11] Patent Number: 5,870,358
[45] Date of Patent: *Feb. 9, 1999

[54] DISK RECORDING/REPRODUCING APPARATUS HAVING MAGAZINE FOR ACCOMMODATING A PLURALITY OF DISKS AND A TRAY POSITION CHANGING MECHANISM

[75] Inventors: Young-Taek Kim, Suwon; Cheol-Woong Ahn, Seoul, both of Rep. of Korea

[73] Assignee: Samsung Electronics Co., Ltd., Kyungki-Do, Rep. of Korea

[ * ] Notice: The term of this patent shall not extend beyond the expiration date of Pat. No. 5,867,470.

[21] Appl. No.: 685,615

[22] Filed: Jul. 24, 1996

[30] Foreign Application Priority Data

Oct. 31, 1995 [KR] Rep. of Korea .................. 1995-39054

[51] Int. Cl.$^6$ .................................................. G11B 17/22
[52] U.S. Cl. .............................................................. 369/36
[58] Field of Search ................................ 369/75.1, 75.2, 369/77.1, 77.2, 36, 178, 192; 360/92, 94, 98.01, 98.04

[56] References Cited

U.S. PATENT DOCUMENTS

| | | | |
|---|---|---|---|
| 4,949,328 | 8/1990 | Kase et al. | 369/75.2 |
| 5,123,001 | 6/1992 | Nakamichi et al. | 369/38 |
| 5,146,446 | 9/1992 | Ota et al. | 369/77.2 |
| 5,226,032 | 7/1993 | Ikedo et al. | 369/178 |
| 5,265,078 | 11/1993 | Akiyama et al. | 369/36 |
| 5,327,412 | 7/1994 | Lee | 369/178 |
| 5,384,760 | 1/1995 | Kumakura | 369/38 |
| 5,615,197 | 3/1997 | Choi | 369/77.2 |

*Primary Examiner*—George J. Letscher
*Attorney, Agent, or Firm*—Sughrue, Mion, Zinn, Macpeak & Seas, PLLC

[57] ABSTRACT

A disk recording/reproducing apparatus has an improved structure such that a disk seated on a disk seating unit is inserted between rollers for transferring the disk to a magazine without a separate extracting lever between the rollers and the disk seating unit, thereby simplifying the structure. A tray position changing mechanism is provided which horizontally moves the tray, having the disk seating unit thereon, from a first position to a second position where the disk is inserted between the rollers.

8 Claims, 17 Drawing Sheets

DISK RECORDING/REPRODUCING APPARATUS HAVING MAGAZINE FOR ACCOMMODATING A PLURALITY OF DISKS AND A TRAY POSITION CHANGING MECHANISM

BACKGROUND OF THE INVENTION

The present invention relates to a disk recording/reproducing apparatus having a magazine-type disk changer for accommodating a plurality of disks and, more particularly, to a disk recording/reproducing apparatus having an improved structure for facilitating the disk changing operation.

A disk recording/reproducing apparatus having a magazine-type disk changer adapted to accommodate a plurality of disks extracts one of the disks accommodated in the magazine for reproduction and inserts reproduced disks into the magazine for storage. An example of such a disk recording/reproducing apparatus is schematically shown in FIGS. 1A and 1B.

Referring to FIGS. 1A and 1B, a magazine 20 movable up and down in the arrow direction and a subtray 30 are installed within a housing 10 of a disk recording/reproducing apparatus 1. Multiple layers of disk receiving shelves 21 are formed in the magazine 20 so that a plurality of disks can be placed therein. A tray 50 is supported by the subtray 30 to be slidable forward and backward with respect to the housing 10. A pair of complementary rollers 60 are installed between the tray 50 and magazine 20. A disk inserted between the rollers 60 is pressingly transferred from the tray 50 to the magazine 20, or vice versa, depending on the rotational direction of the rollers 60. There is a turntable 41 on the top of a deck 40 which lifts and supports a disk D seated on the tray 50 as the deck 40 is lifted. Then, the disk, placed and supported on turntable 41, can be reproduced or recorded by an optical pickup (not shown). After the reproduction or recording is completed, the deck 40 is lowered and the disk placed and supported on the turntable 41 is again placed on the tray 50. Then, the disk can be inserted between the rollers 60 and pressingly transferred to the disk receiving shelves 21 of the magazine 20 by the rollers 60.

However, in the conventional disk recording/reproducing apparatus, in order to insert the disk seated on the tray between the rollers 60, a separate disk transferring means such as an extracting lever (not shown) must be installed near the tray. Accordingly, the apparatus becomes complicated and costs increase.

SUMMARY OF THE INVENTION

To solve the problems of the prior art, it is an object of the present invention to provide a disk recording/reproducing apparatus having an improved structure for transferring a disk seated on a tray to a magazine.

To accomplish the above object, there is provided a disk recording/reproducing apparatus comprising: a housing including a front wall having a disk entrance therein; a magazine having a plurality of disk receiving shelves and being elevatably installed within the housing; a deck fixed on the housing and on which a turntable, where a disk is seated, and an optical pickup are mounted; a subtray elevatably installed above the deck; a tray having a disk seating unit thereon and slidably supported by said subtray to be movable horizontally forward and backward with respect to the housing; a pair of rollers rotatably installed between the magazine and the tray and operative to pressingly transfer a disk inserted therebetween to a predetermined position; the tray being raised or lowered at a first position where a disk seated on the disk seating unit is spaced apart from the rollers; tray position changing means for horizontally moving the tray from the first position to a second position where the disk seated on the disk seating unit is inserted between the rollers; and means for locking the tray at the first position and the second position.

The tray position changing means includes a rotator installed on the subtray and having a coupling protrusion at a position near its edge; a driving source for rotating the rotator; and a first wall and a fourth wall protruding underneath the tray and disposed parallel to each other spaced a distance apart from each other which is smaller than the rotational diameter of the coupling protrusion. The coupling protrusion is inserted between the first wall and the fourth wall by the rotation of the rotator when the tray is positioned at the first position, the coupling protrusion pressing against the fourth wall thereby moving the tray to the second position by the rotation of the rotator in one direction, and the coupling protrusion pressing against the first wall thereby moving the tray to the first position by the rotation of the rotator in the other direction. The tray locking means includes a second wall and a third wall formed in parallel between the first and fourth walls of the tray, the coupling protrusion being inserted between the first wall and the second wall to limit the movement of the tray when the tray is positioned at the first position, and the coupling protrusion being inserted between the third wall and the fourth wall to limit the movement of the tray when the tray is positioned at the second position.

BRIEF DESCRIPTION OF THE DRAWINGS

The above objects and advantages of the present invention will become more apparent by describing in detail preferred embodiments thereof with reference to the accompanying drawings, in which.

DETAILED DESCRIPTION OF THE PREFERRED EMBODIMENTS

Figure 1A:
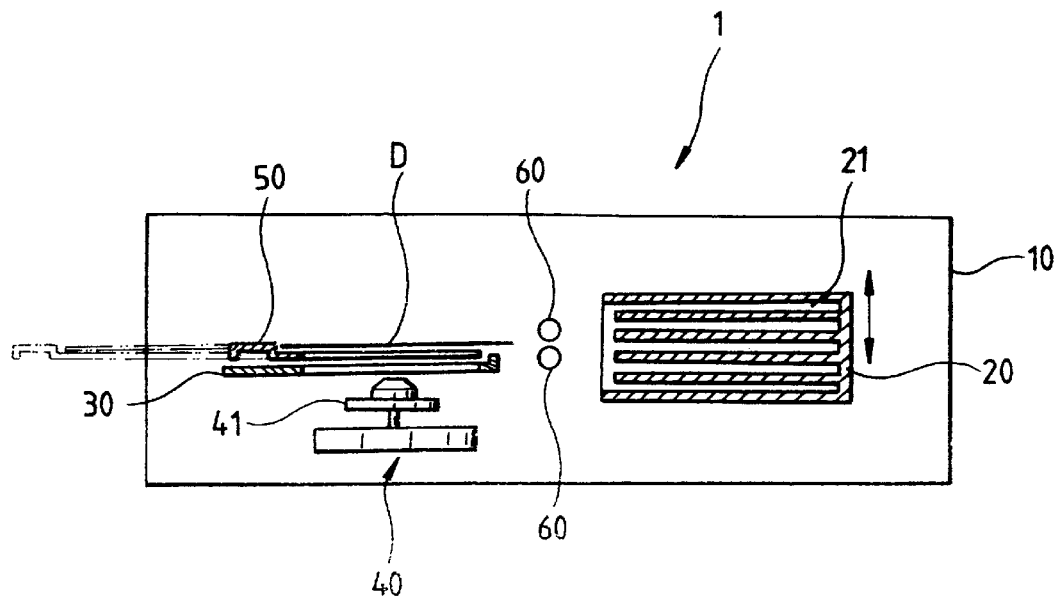
FIG. 1A is a schematic diagram of a conventional disk recording/reproducing apparatus showing the tray protruding outside of the housing.
Figure 1B:
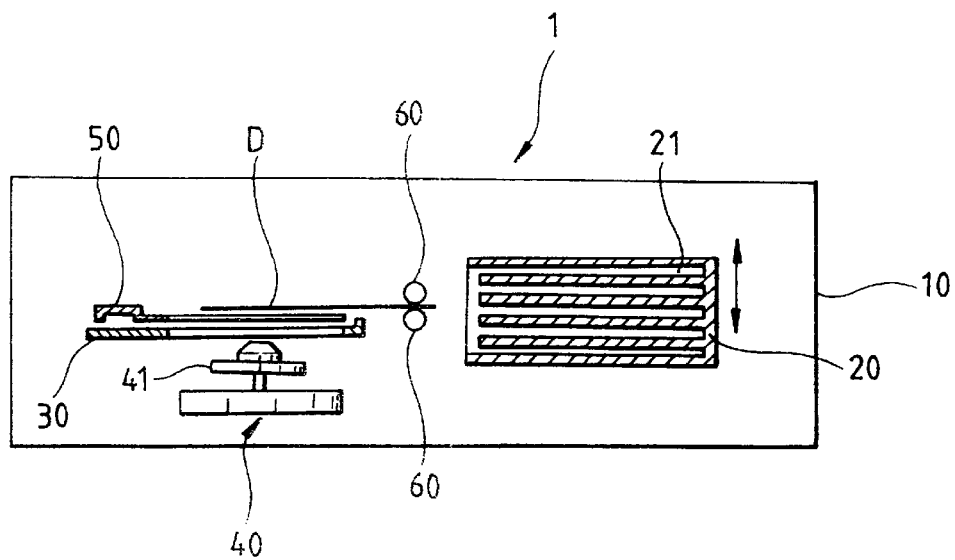
FIG. 1B is a schematic diagram of the conventional disk recording/reproducing apparatus showing a disk being inserted between rollers.

Referring to FIGS. 2 through 7, a disk entrance 111 is formed through a front wall of a housing 110 so that a disk can be inserted into and ejected from the inside of the housing 110, in a disk recording/reproducing apparatus 100 according to the present invention. A magazine 120 having multiple layers of receiving shelves 121 disposed for receiving a plurality of disks is provided inside the housing 110 at the rear thereof. The magazine 120 is screw-coupled to a screw stock or shaft 122 rotatably connected to the housing 110. The magazine 120 is connected along a guide stock or rod 122a and elevates along the guide stock 122a as the screw stock 122 is rotated.

A subtray 130 and a deck 140 are installed between the disk entrance 111 and the magazine 120. The subtray 130 is elevatably installed along the guide stocks or rods 131, and the deck 140 is fixed at the bottom of the housing 110.

Figure 5:
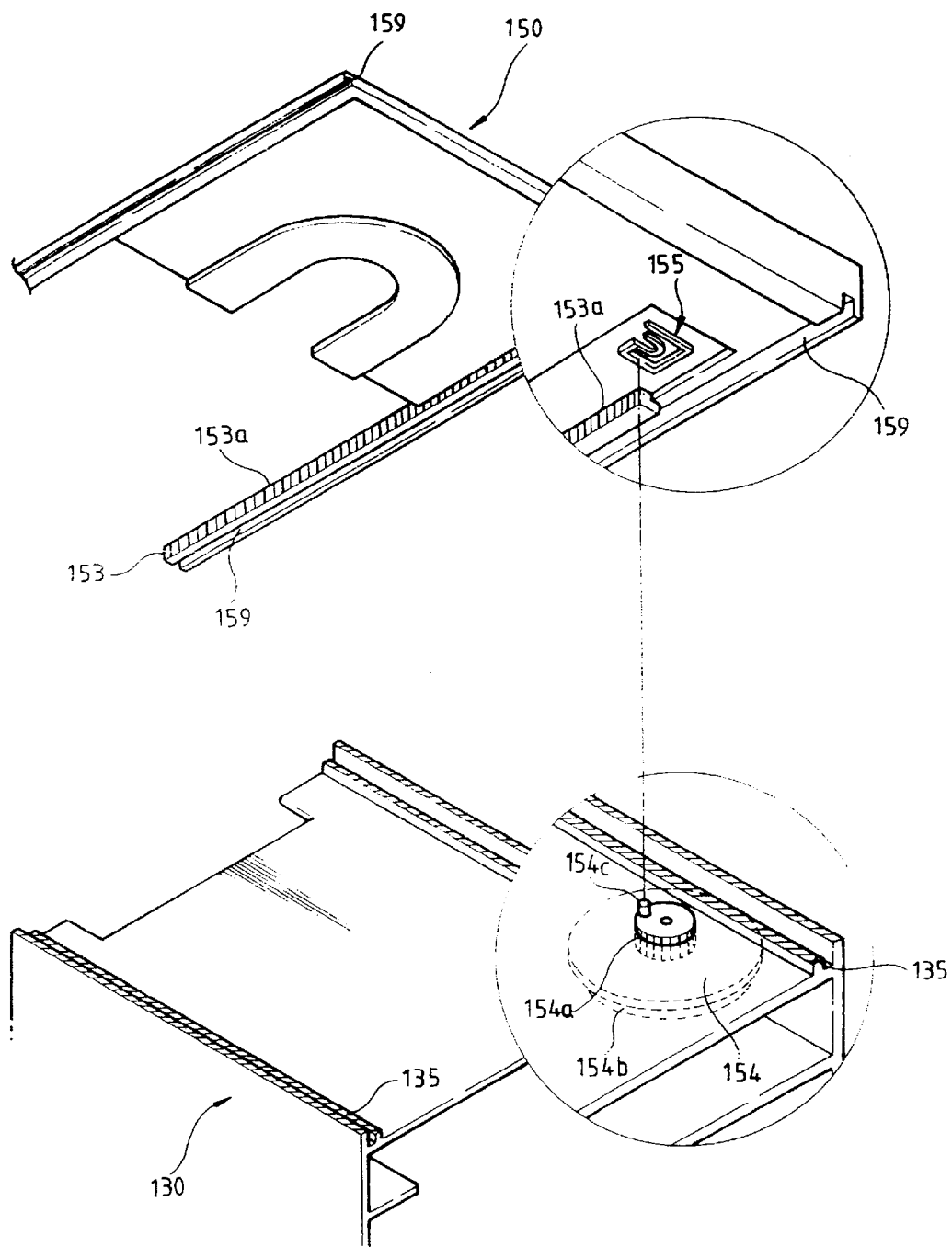
FIG. 5 is an exploded perspective view of the bottom of the first tray and the subtray shown in FIG. 2.
Figure 6:
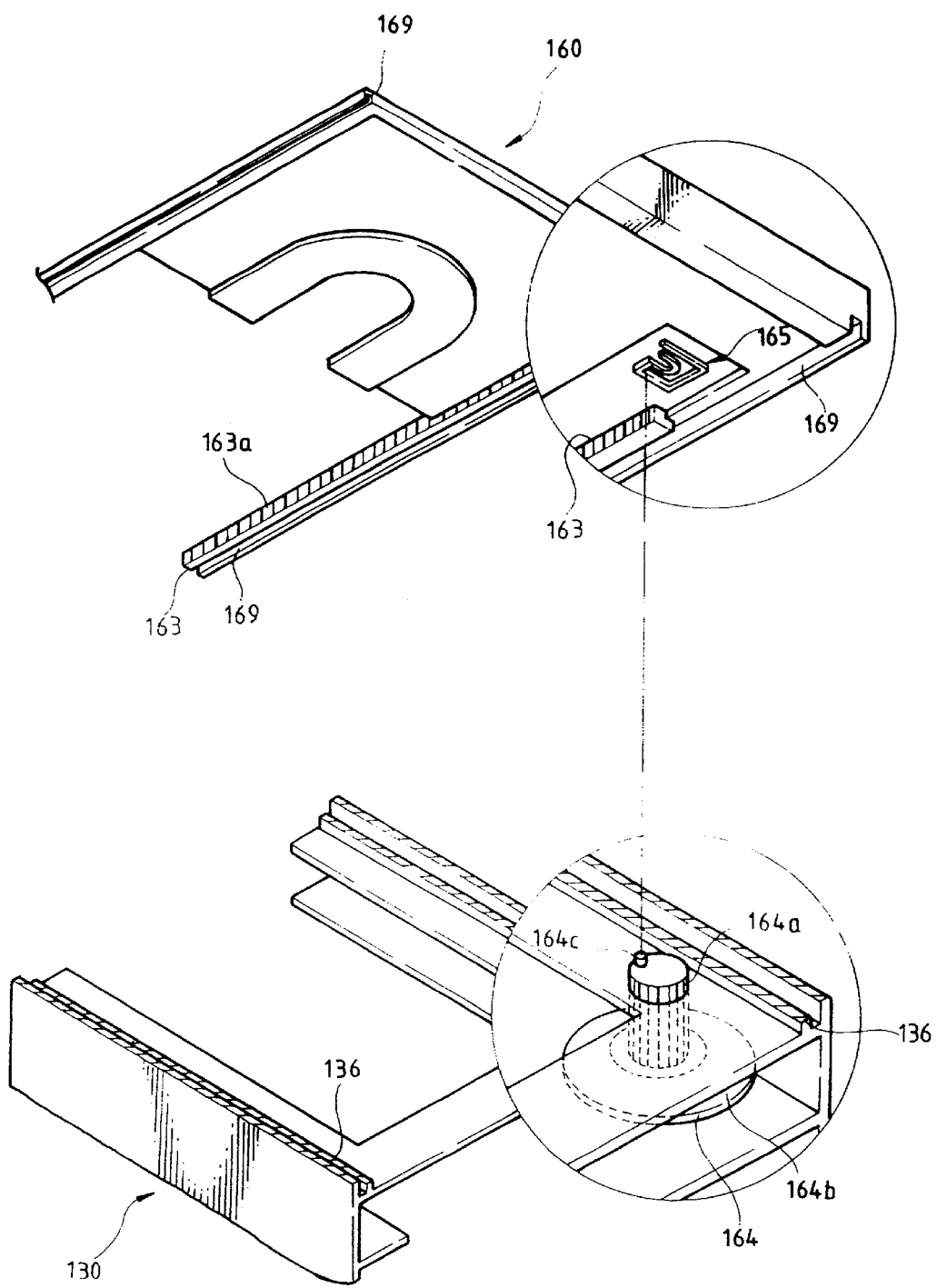
FIG. 6 is an exploded perspective view of the bottom of the second tray and the subtray shown in FIG. 2.
Figure 12:
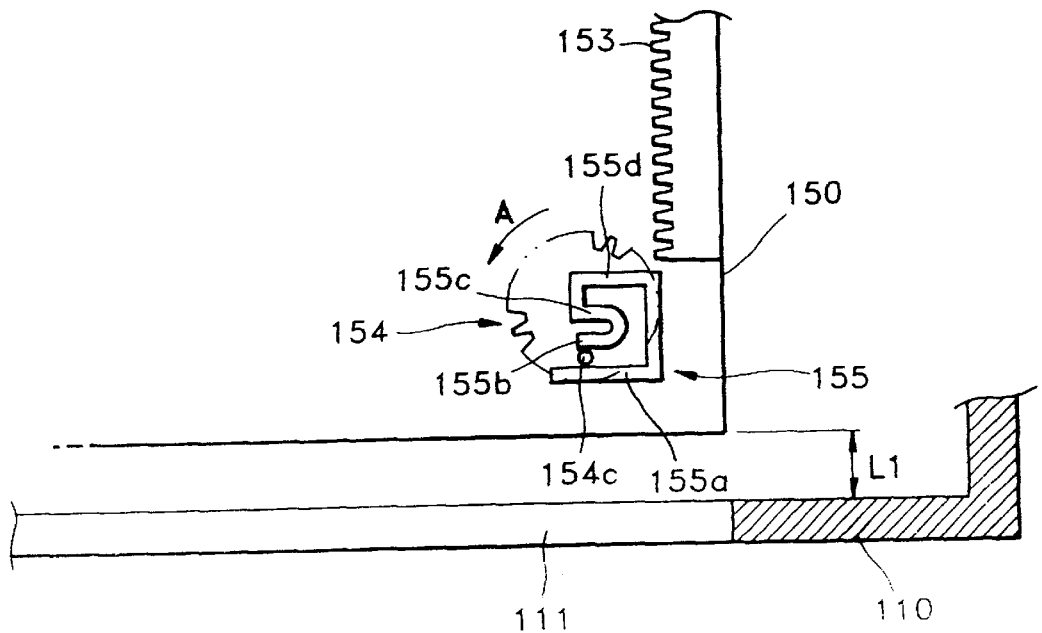
FIGS. 12 through 14 are structural plan views of important portions, sequentially showing the positional relationship between a locking rib of the first tray and a connecting protrusion of a first rotator when the first tray is transferred from a first position to the second position.

A first tray 150 is supported in the upper portion of the subtray 130 and a second tray 160 is supported in the lower portion of the subtray 130 between the first tray 150 and the deck 140. The first tray 150 and second tray 160 are vertically spaced from each other by the elevation distance of the subtray 130. The second tray 160 is positioned at the same height as that of the disk entrance 111 when the subtray 130 is in a raised state, and the first tray 150 is positioned at the height of the disk entrance 111 when the subtray 130 is in a lowered state. A disk seating unit 151 on which a disk D1 is placed is formed on top of the first tray 150, and a parallel pair of guiding units 152 and 153 which extend to the back of the housing are installed at both sides of the first tray 150. As shown in FIG. 5, there are guide grooves 159 formed at the bottoms of the respective guiding units 152 and 153. The guide grooves 159 are slidably connected to a pair of guide rails 135 formed at the sides of the subtray 130 beneath the first tray 150. Thus, the first tray 150 can move forward and backward with respect to the housing 110 on the subtray 130. A rack 153a is formed at the inner side of the guiding unit 153 from the leading edge of the guiding unit 153 adjacent to a locking rib 155 at the other end thereof. As shown in FIG. 12, the locking rib 155 protruding from the bottom of the first tray 150 has a first wall 155a, a second wall 155b, a third wall 155c and a fourth wall 155d, spaced a predetermined interval apart in parallel with one another, adjacent to the front edge of first tray 150.

The second tray 160 has the same configuration as that of the first tray 150. In other words, there is a disk seating unit 161 formed on the upper portion of the second tray 160 onto which a disk D2 can be placed. The second tray 160 is movable horizontally forward and backward with respect to the housing 110, by slidably connecting the guide grooves 169 formed at the bottoms of respective guiding units 162 and 163 to a pair of guide rails 136 formed at the sides of the subtray 130 beneath the second tray 160. Also, the second tray 160 has a rack 163a and a locking rib 165 (see FIG. 6), each having the same configuration as the corresponding elements of the first tray 150.

Figure 3:
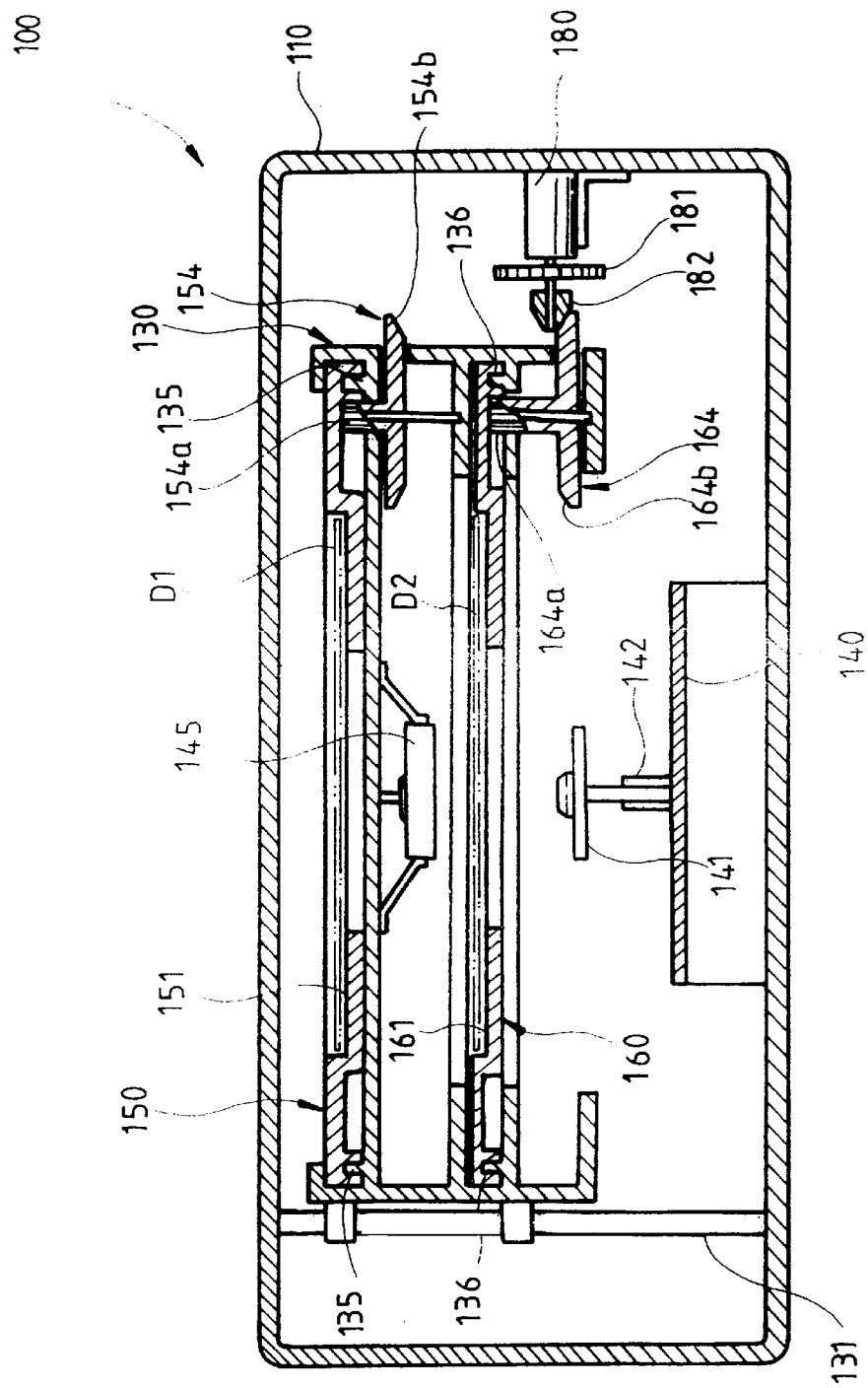
FIG. 3 is a sectional view taken along the line III—III of FIG. 2.

Referring to FIGS. 3 and 5, there is a first rotator 154 rotatably installed at one end portion of the subtray 130. A gear 154a, which is operative to engage the rack 153a of the first tray 150, is formed on the upper side of the first rotator 154 and a coupling protrusion 154c protrudes up from a peripheral portion of the gear 154a. The rotation diameter of the coupling protrusion 154c depending on the rotation of the first rotator 154 is set to be larger than the interval between the first wall 155a and fourth wall 155d of the locking rib 155 formed underneath the first tray 150. A friction unit 154b is formed at the lower side of the first rotator 154.

A second rotator 164 having a gear 164a, a coupling protrusion 164c and a friction unit 164b, similar to the first rotator 154, is rotatably installed in the lower portion of subtray 130. The gear 164a of second rotator 164 is geared to the rack 163a of the second tray 160 just as in the case of the first tray 150.

The friction unit 154b of the first rotator 154 and the friction unit 164b of the second rotator 164 are installed so that they face each other. The respective friction units 154b and 164b protrude slightly outside the subtray 130 via openings in a sidewall thereof.

Disk recording/reproducing elements such as a turntable 141 for disk rotation and an optical pickup 142 for light beam emission are installed in the deck 140. When the subtray 130 is lowered, the disk D2 seated in disk seating unit 160 of the second tray 160 is transferred to and supported by the turntable 141 which protrudes up slightly with respect to the disk seating unit 161. A clamp 145 is installed between the first tray 150 and second tray 160 of the subtray 130. When the subtray 130 is lowered, the clamp 145 applies pressure to the top of the disk D2 supported by the turntable 141 to prevent wobbling of the disk D2.

A tray driving motor 180 is fixed on a sidewall inside the housing 110. A friction member 182 is fixed on the output shaft of the tray driving motor 180. The friction member 182 selectively contacts the friction unit 154b of the first rotator 154 or the friction unit 164b of the second rotator 164 according to the elevation of the subtray 130. The friction member 182, made of a material having a large friction coefficient such as rubber, makes close contact to the friction unit 154b of first rotator 154 when the subtray 130 is in a lowered state and closely contacts the friction unit 164b of the second rotator 164 when the subtray 130 is in a raised state. The friction member 182 is provided as a tray transferring means, together with the first rotator 154 and second rotator 164, for inserting and ejecting either the first tray 150 or the second tray 160, whichever is positioned at the height of the disk entrance 111, into or from the disk entrance 111.

Figure 4:
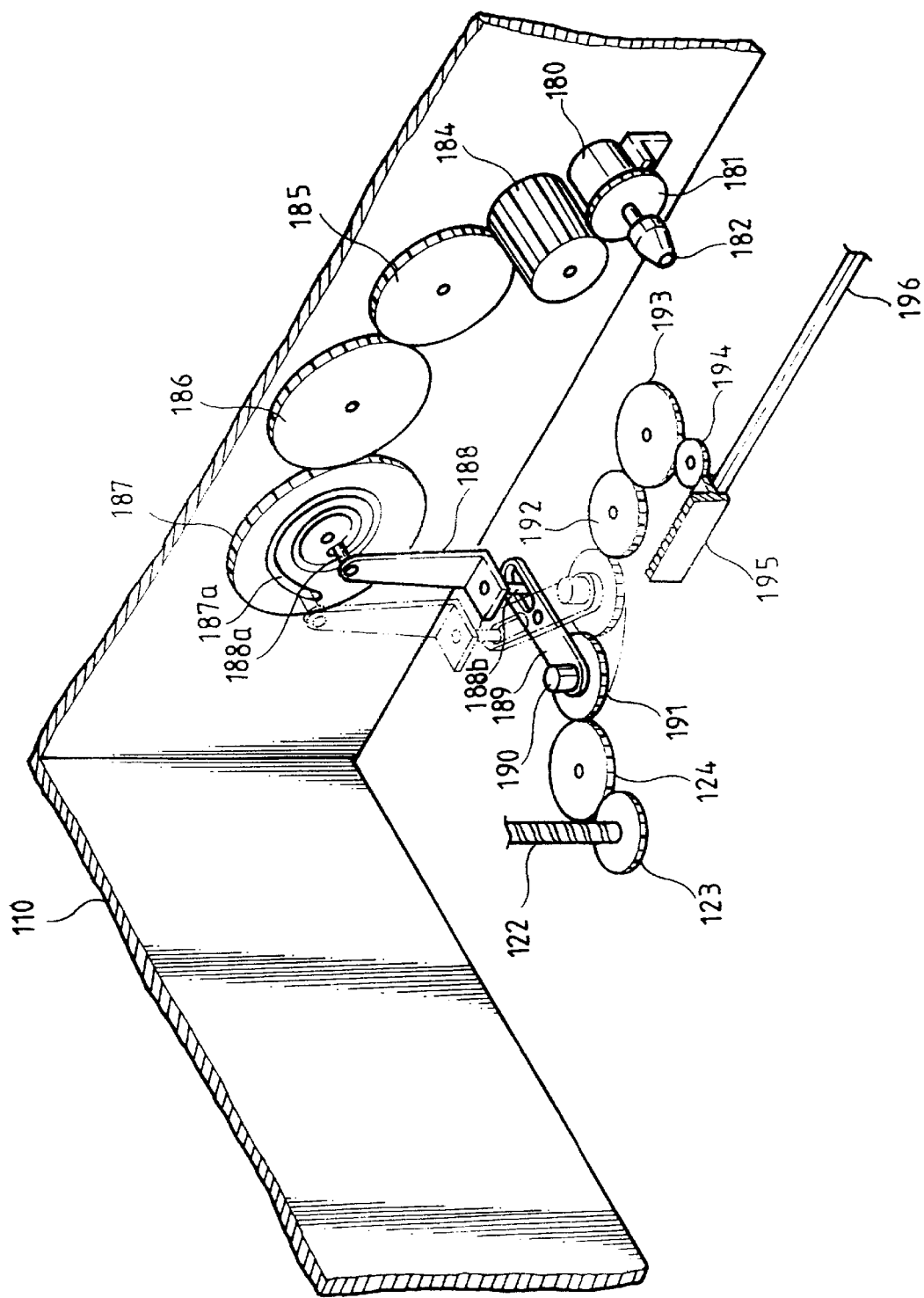
FIG. 4 is a schematic perspective view showing the inside of the housing shown in FIG. 2.

Referring to FIG. 4, a driving gear 181 is coupled on the output shaft of the tray driving motor 180, together with the friction member 182. The driving gear 181 is geared to a rotation cam plate 187 with a train of gears 184, 185 and 186 interposed therebetween. A snail cam groove 187a which loosens from the center of the rotation cam plate 187 to the periphery thereof is formed in the rotation cam plate 187.

An upper protrusion 188a formed on one end of a slide member 188 movably installed to be movable forward and backward with respect to housing 110 is coupled in the snail cam groove 187a. A lower protrusion 188b formed on the other end of the slide member 188 is connected to one end of a rotating member 189 rotatably coupled at the bottom of the housing 110. A coupling gear 191 is rotatably connected to the other end of the rotating member 189. An elevating motor 190 connected to the rotating member 189 rotates the coupling gear 191 so that the coupling gear 191 remains in gear or mesh with the first connecting gear 124 or the second connecting gear 192. The coupling gear 191 is meshed with the first connecting gear 124 or the second connecting gear 192 depending on the direction of rotation of the rotating member 189.

The first connecting gear 124 is coupled to a gear 123 fixed at the bottom of the screw stock 122. The first connecting gear 124 selectively connected to the coupling gear 191 by the tray driving motor 180, the screw stock 122 connected to the first connecting gear 124 via the gear 123 and the elevating motor 190 are provided as a magazine elevating means for elevating the magazine 120.

Figure 8:
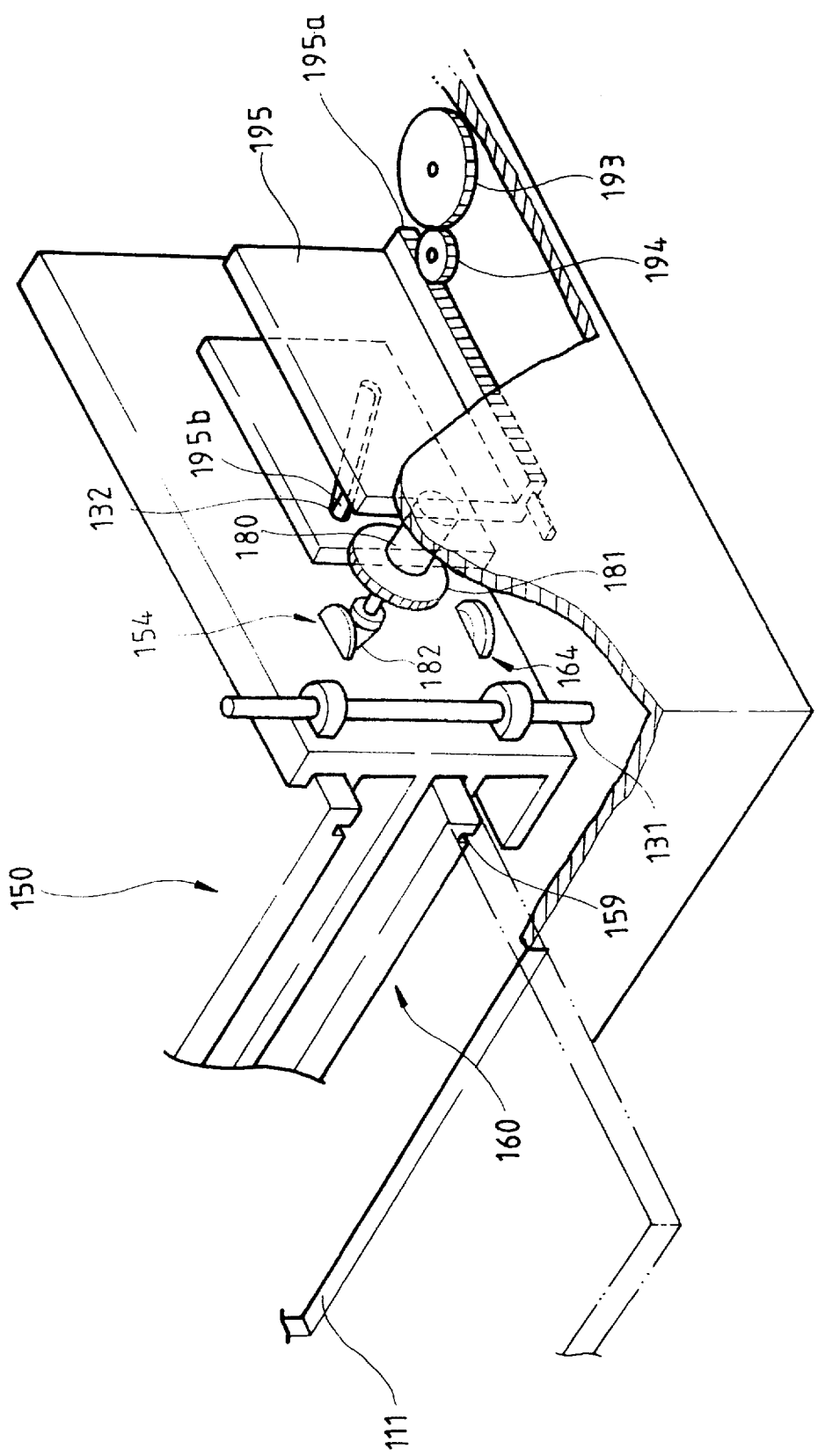
FIG. 8 is a perspective view showing important portions with the subtray in a lowered state.

Referring to FIGS. 4 and 8, the second connecting gear 192 is connected to a gear portion 195a of a rack member 195 with a train of gears 193 and 194 interposed therebetween. The rack member 195 is slidably connected forward and backward with respect to the housing 110 along a rail 196 installed at the bottom of the housing 110. On one side of the rack member 195 there is a protrusion 195b. The protrusion 195b is slidably inserted into a diagonal cam groove 132 formed in the sidewall of the subtray 130. This allows the subtray 130 to move up and down as the rack member 195 moves forward and backward. The rack member 195 having the aforementioned configuration is provided as a subtray elevating means together with the coupling gear 191 selectively connected to the second connecting gear 192 by the tray driving motor 180 and the elevating motor 190 for rotating the coupling gear 191 in opposite directions.

A pair of rollers 170 are installed between the subtray 130 and the magazine 120. The rollers 170 are provided as a disk transferring means for transferring a disk from the magazine 120 to the disk seating unit of either the first tray 150 or the second tray 160, whichever is positioned at the height of the disk entrance 111 of the housing 110, or to place a disk seated on the disk seating unit of the tray into magazine 120. If the rollers 170 rotate after the disk is inserted therebetween, the disk is pressingly transferred from the subtray 130 to the magazine 120 by the frictional force of the rollers 170, or from the magazine 120 to the subtray 130, depending on the rotational direction of the rollers 170.

In the raised state of the subtray 130, the first and second trays 150 and 160 are supported at a first position where the disks D1 and D2 in disk seating units 151 and 161 are spaced apart from the rollers 170 by a predetermined distance. During the lowering of the subtray 130, the disk D2 seated in the disk seating unit 161 of the second tray 160 is placed on and supported by the turntable 141 of the deck 140.

With the subtray 130 in a lowered state, the first tray 150 may be moved horizontally between the first position and a second position where the disk D1 seated in the disk seating unit 151 is inserted between the rollers 170 of the housing 110, by a first tray position changing means having the first rotator 154 with the coupling protrusion 154c connected to the locking rib 155 and the tray driving motor 180. The first tray 150 can be locked at the first position or the second position.

With the subtray 130 in a raised position, the second tray 160 may also be moved horizontally from the first position to a second position where the disk D2 seated in the disk seating unit 161 is inserted between the rollers 170 by a second tray position changing means having the second rotator 164 with the coupling protrusion 164c connected to the locking rib 165 and the tray driving motor 180. The second tray 160 can be locked at the first or second position.

The operation of the disk recording/reproducing apparatus having the aforementioned configuration will now be described.

Figure 7:
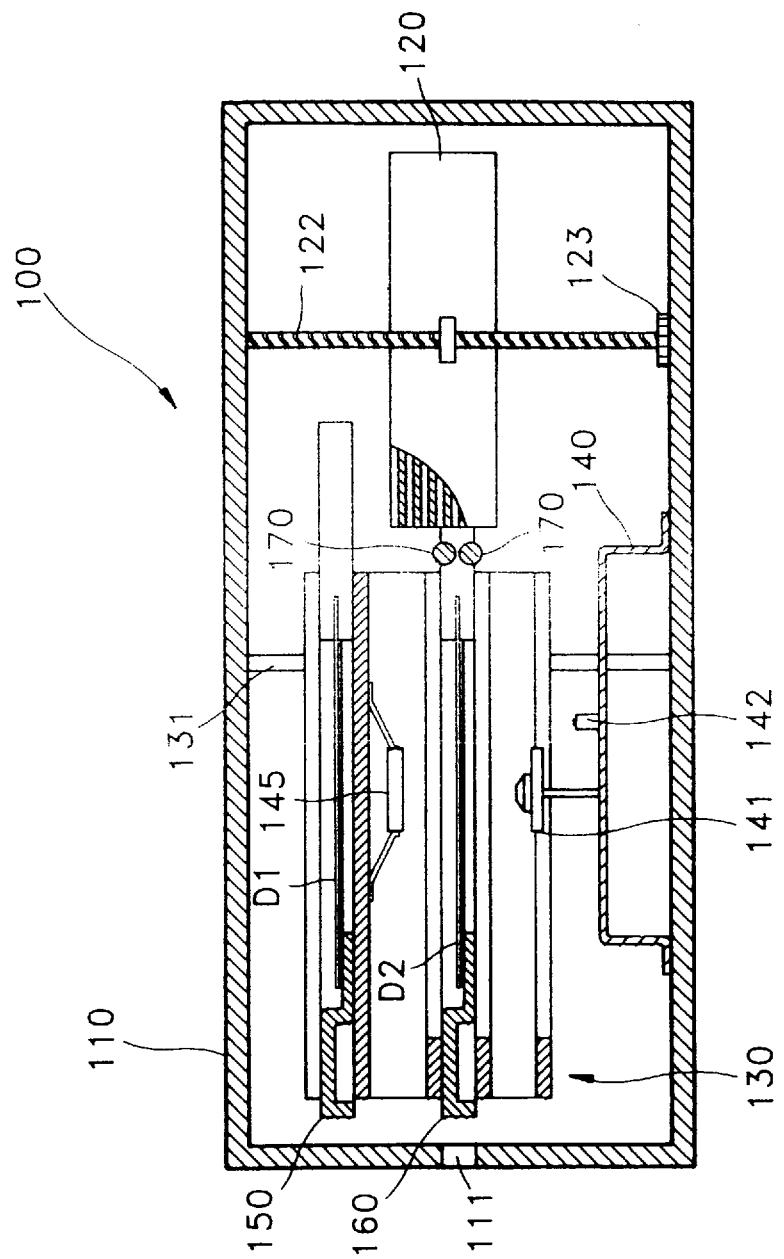
FIG. 7 is a sectional view taken along the line VII—VII of FIG. 2.

First, as shown in FIGS. 3 and 7, if the disk D2 seated in the disk seating unit 161 of the second tray 160 is to be recorded or reproduced in the raised state of the subtray 130, the subtray 130 must be lowered. For this purpose, if the tray driving motor 180 is rotated in one direction, the driving gear 181 fixed on the output shaft of the tray driving motor 180 rotates, and the rotation cam plate 187 rotates by the train of gears 184, 185 and 186 connected to the driving gear 181. The slide member 188 whose upper protrusion 188a is coupled to the snail cam groove 187a of the rotation cam plate 187 is transferred from the state depicted by the solid line to that depicted by the dashed line in FIG. 4 by the rotation of the rotating cam plate 187. At this time, the rotating member 189 connected to the slide member 188 also rotates in the manner as depicted by the dashed line in FIG. 4, and the coupling gear 191 rotatably connected to the end of the rotating member 189 is meshed with the second connecting gear 192.

In such a state, if the elevating motor 190 rotates in one direction to rotate the coupling gear 191, the rotational force is transferred to the rack member 195 via the train of gears 192, 193 and 194. The rack member 195 is transferred from the state shown in FIG. 2 to the front of the housing 110 along the rail 196. According to the movement of the rack member 195, the protrusion 195b of the rack member 195 slides along inside diagonal cam groove 132 to raise or lower the subtray 130 as shown in FIGS. 8 through 10.

Figure 9:
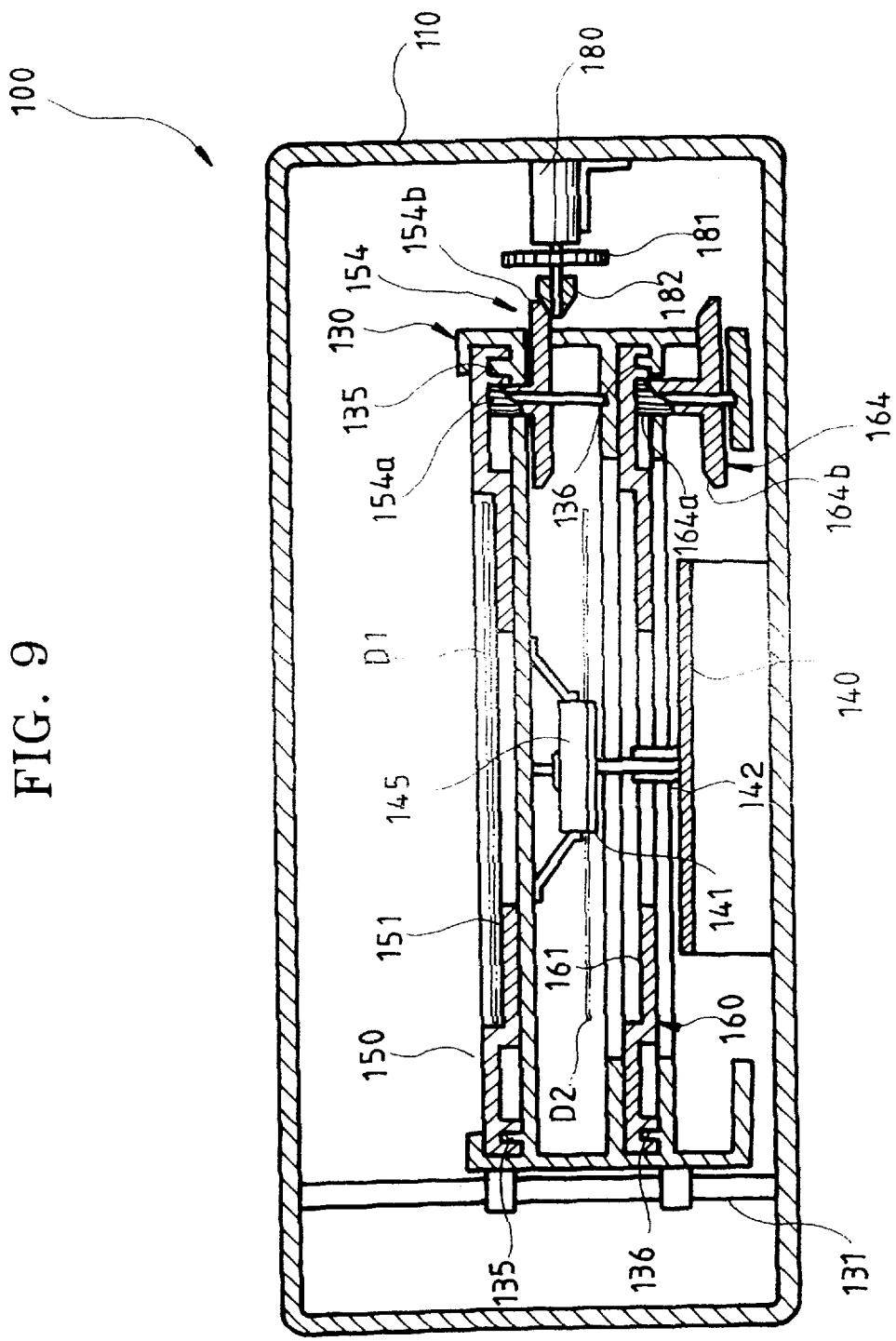
FIG. 9 is a schematic sectional view, as in FIG. 3, with the subtray in its lowered state.
Figure 10:
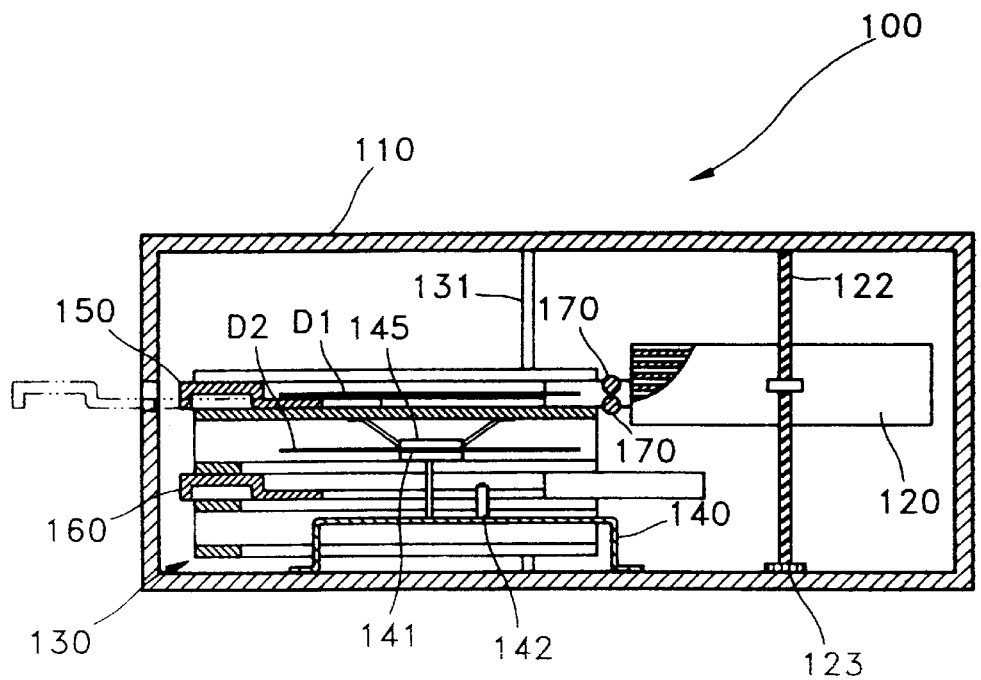
FIG. 10 is a schematic sectional view, as in FIG. 7, with the subtray in its lowered state.

With the subtray 130 lowered to the position shown in FIGS. 9 and 10, the first tray 150 gets positioned at the height of the disk entrance 111 of the housing 110 and the friction member 182 connected to the output shaft of the tray driving motor 180 makes contact with the friction unit 154b of the first rotator 154. At this time, the gear 154a of the first rotator 154 disengages with the rack 153a of the first tray 150. The coupling protrusion 154c of the first rotator 154 is positioned between the first wall 155a and the second wall 155b of the locking rib 155. The disk D2 seated in the disk seating unit 161 of the second tray 160 is then transferred to and supported by the turntable 141 of the deck 140. Lastly, the turntable 141 rotates and the optical pickup 142 moves radially along the disk D2 to then record information onto or read information from the disk D2.

Figure 11:
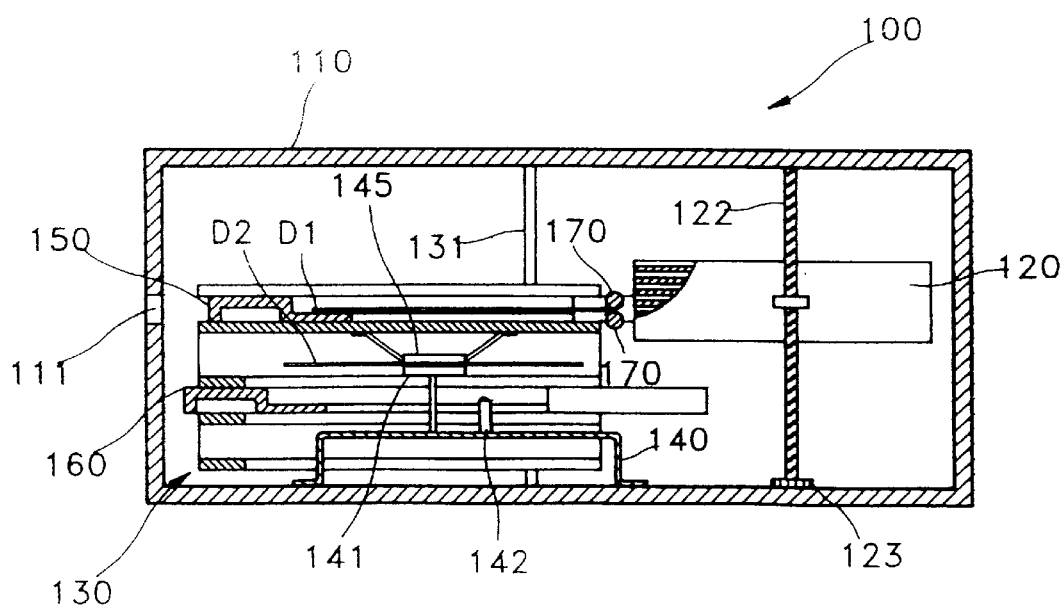
FIG. 11 is a schematic sectional view showing the first tray moved to a second position.

In this manner, during recording or reproducing of the disk D2, the first tray 150 can be moved between a position where it protrudes outside the housing 110 via disk entrance 111 as indicated by the dashed line of FIG. 10 and the position shown in FIG. 11. The movement between positions can be described as follows. First, as shown in FIG. 12, in the state where the first tray 150 is located inside the housing 10 apart from the disk entrance 111 by a constant distance L1, if the tray driving motor 180 is operated so that the first rotator 154 rotates in the direction indicated by arrow A, the friction member 182 fixed on the output shaft of the tray driving motor 180 also rotates. At this time, the first rotator 154 rotates by the friction force of the friction unit 154b with the friction member 182.

Figure 13:
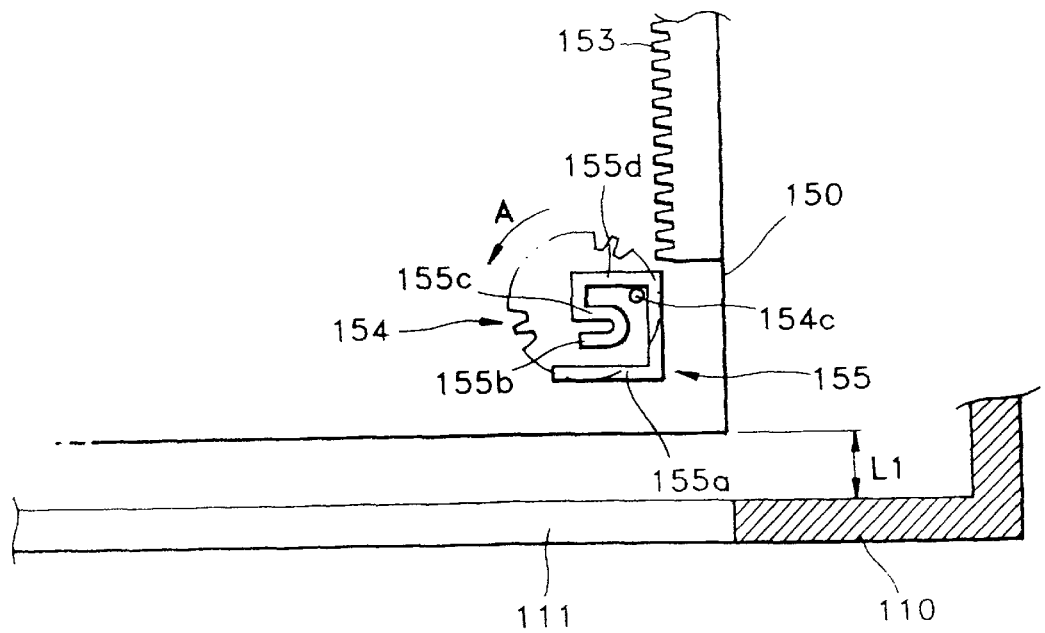
Figure 14:
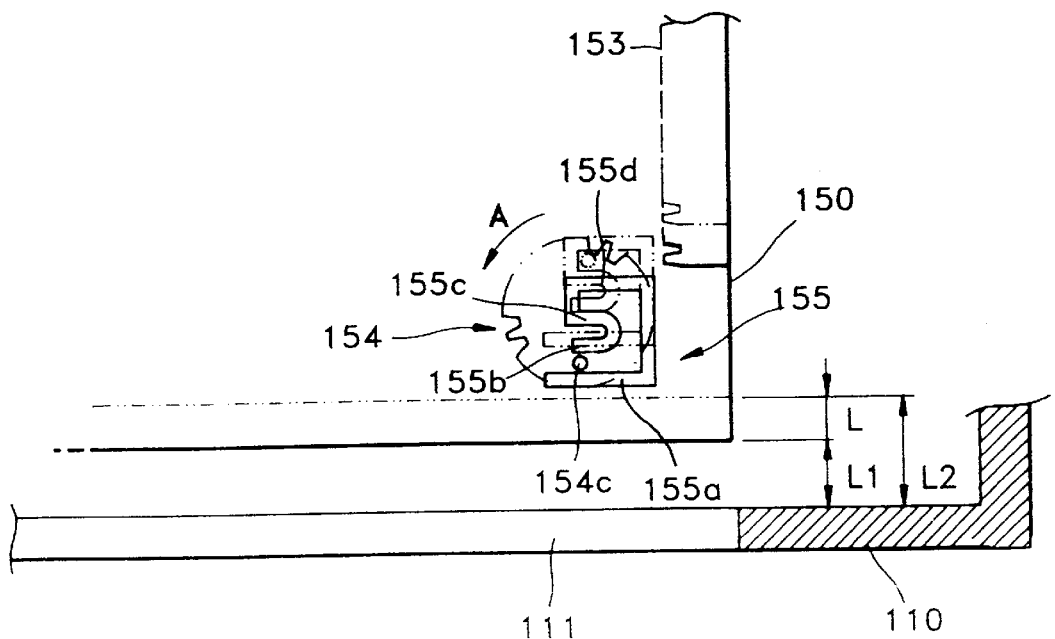

According to the rotation of the first rotator 154, the coupling protrusion 154c of the first rotator 154 which is inserted between the first wall 155a and the second wall 155b in the lower portion of the first tray 150, contacts the fourth wall 155d while it rotates in the direction of arrow A, as shown in FIG. 13. Then, according to the continued rotation of the tray driving motor 180, the coupling protrusion 154c presses against the fourth wall 155d to then move the first tray 150 away from the disk entrance 111 of the housing 110 by a predetermined distance L, as indicated by the dashed line of FIG. 14. Accordingly, the first tray 150 is spaced apart from the disk entrance 111 by a predetermined distance L2. At this time, the position of the first tray 150 is positioned at the second position where the disk D1 seated in the disk seating unit 151 is inserted between the rollers 170, as shown in FIG. 11.

In the state where the first tray 150 is positioned at the second position, the coupling protrusion 154c of first rotator 150 is inserted between the third wall 155c and the fourth wall 155d. Then, the first tray 150 is fixed at the second position, with the back and forth movement thereof being prevented.

With the first tray 150 fixed at the second position as described above, the disk D1 seated on the disk seating unit 151 of the first tray 150 is inserted between the rollers 170. As rollers 170 rotate, the disk D1 is pressingly transferred toward the magazine 120 by the friction force of the rollers 170 and is received in a disk receiving shelf positioned at the same height as that of the transferred disk among the disk receiving shelves 121 of the magazine 120.

After the magazine 120 is raised or lowered by an elevation process (to be described later), a disk in another disk receiving shelf is extracted by a wellknown disk extracting means such as an extracting lever (not shown) installed within the disk receiving shelf to then be pressingly transferred toward first tray 150 while being inserted between the rollers 170. Then, the disk extracted from the magazine 120 and pressingly transferred by the rollers 170 is seated in the disk seating unit 151. In this way, if the upper disk D1 of the first tray 150 is inserted between the rollers 170 by the movement of the first tray 150 to the second position, the need to install a separate lever for inserting a disk on the tray between the rollers 170 is eliminated, as compared with the conventional disk recording/reproducing apparatus.

Figure 15:
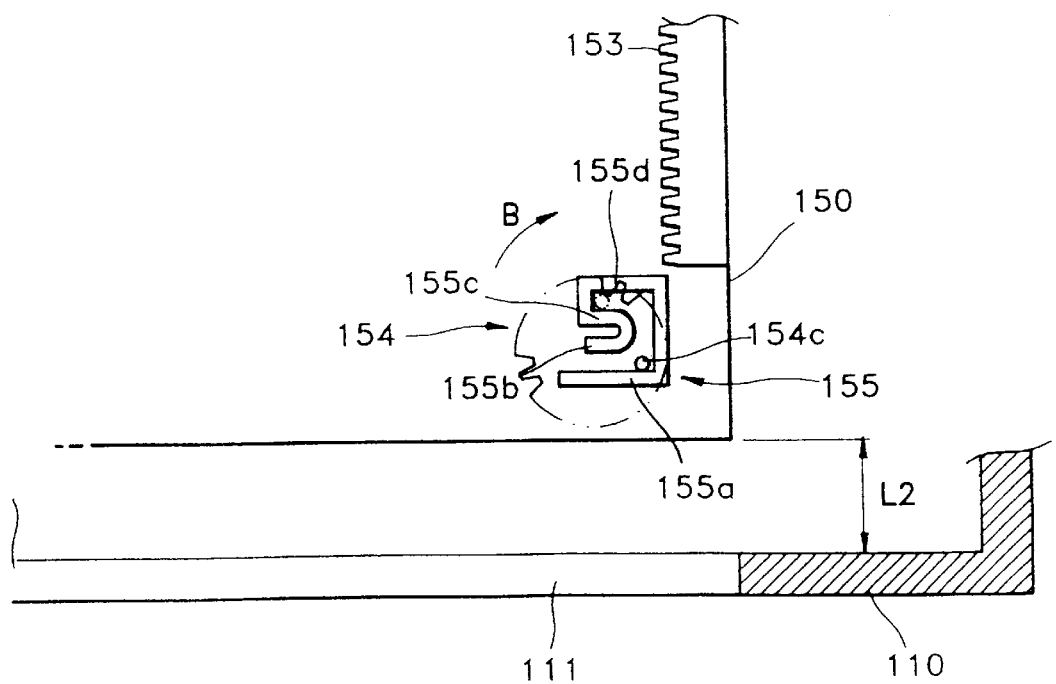
FIGS. 15 and 16 are structural plan views of important portions, sequentially showing the positional relationship between the locking rib of the first tray and the connecting protrusion of the first rotator when the first tray is transferred from the second position to the first position.
Figure 16:
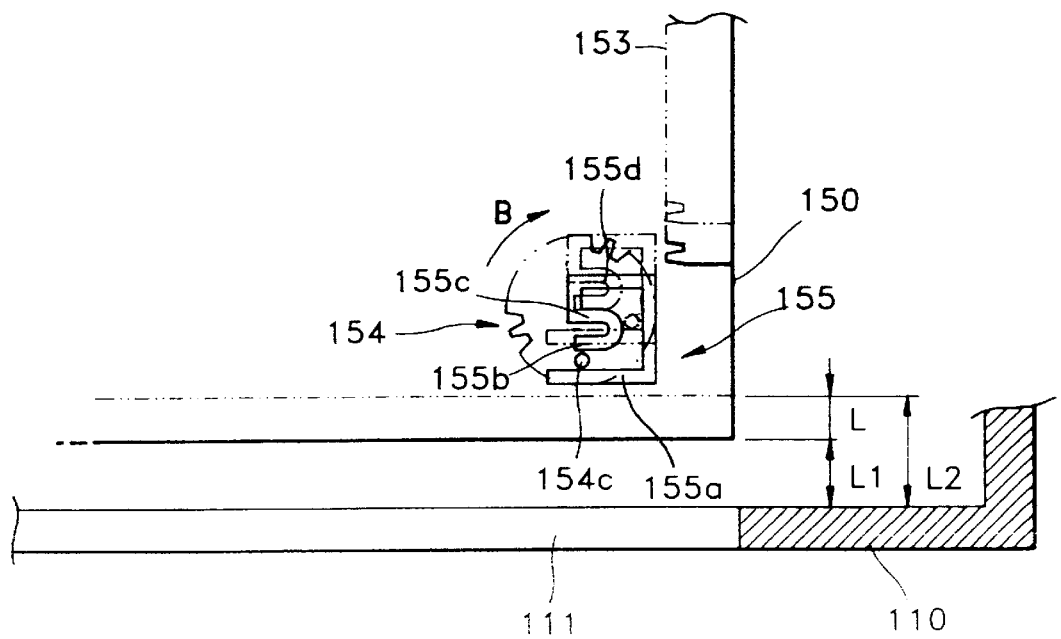

The first tray 150, having received a new disk from the magazine 120 by the rollers 170 at the second position, moves back to the first position by the rotation of the coupling protrusion 154c of the first rotator 154 within the locking rib 155 in the lower portion of the first tray 150. In other words, as depicted by the dashed line of FIG. 15, in the state where the coupling protrusion 154c of the first rotator 154 is inserted between the third wall 155c and the fourth wall 155d of the first tray 150 to fix the first tray 150 at the second position, the tray driving motor 180 is driven so that the first rotator 154 rotates in the direction of arrow B. Accordingly, the coupling protrusion 154c rotates in the direction of arrow B and then makes contact with the first wall 155a, as depicted by the solid line of FIG. 15. The continued rotation of the first rotator 154 causes the coupling protrusion 154c to press against the first wall 155a and reaches a position between the first wall 155a and the second wall 155b, as depicted by the solid line of FIG. 16. In the course of such operation, the first tray 150 is moved toward the disk entrance 111 of the housing 110 the predetermined distance L.

Figure 17:
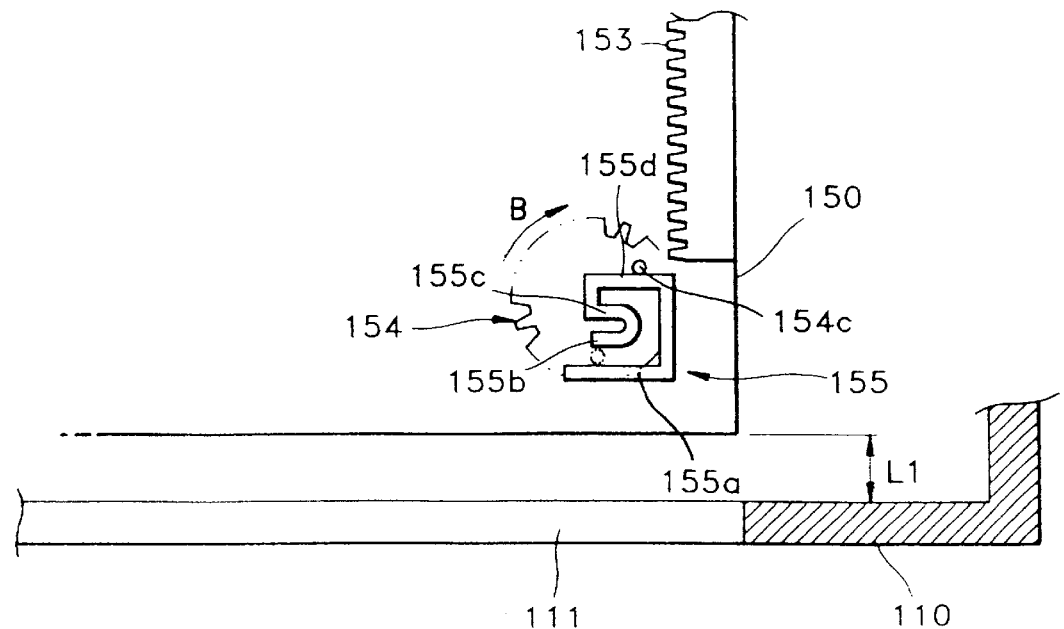
FIGS. 17 through 19 are structural plan views of important portions, sequentially showing the positional relationship between the locking rib of the first tray and the connecting protrusion of the first rotator when the first tray is transferred from the first position to the position where the first tray is projected to the outside of the housing via an opening of the housing.
Figure 18:
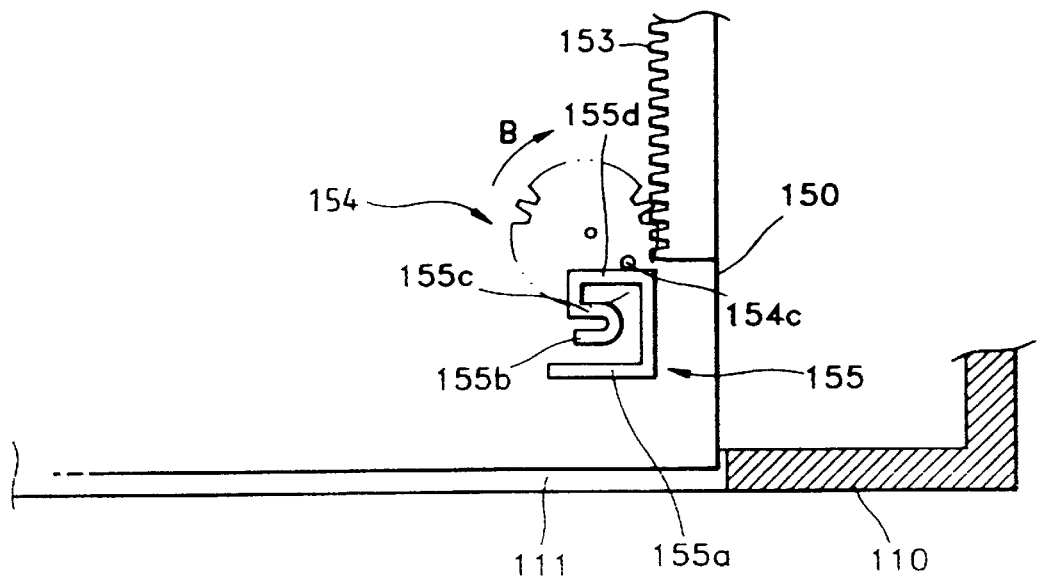
Figure 19:
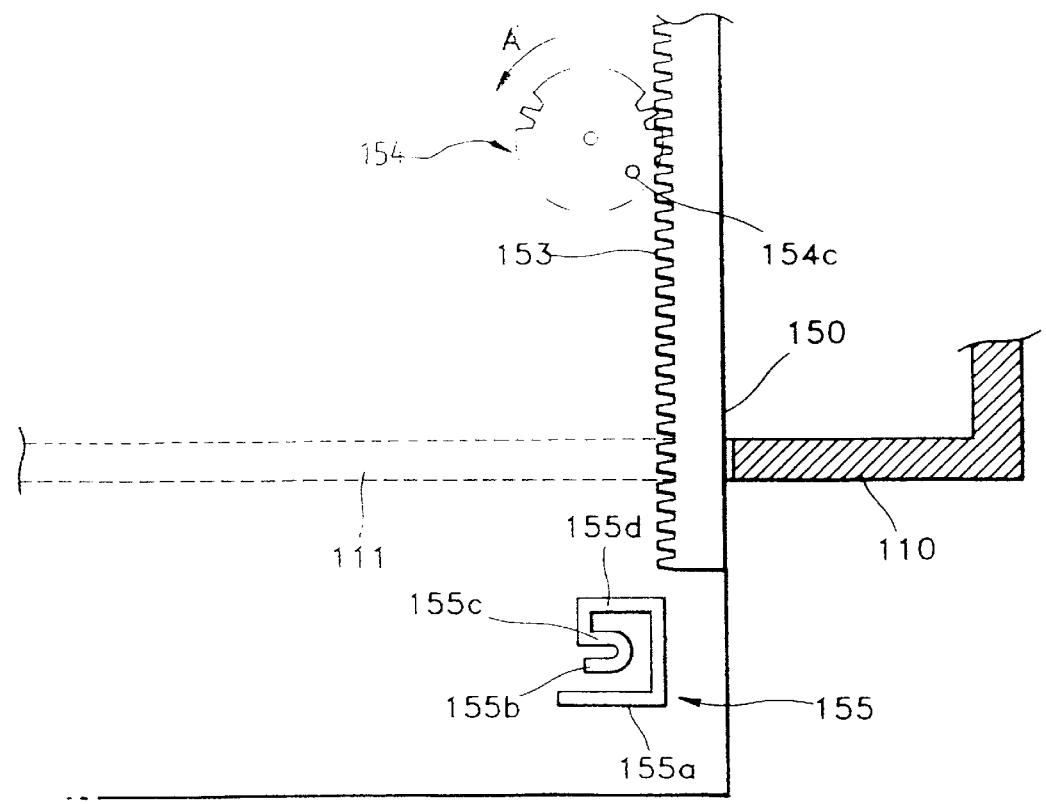

If the rotation of the tray driving motor 180 stops here, the rotation of the first rotator 154 and the coupling protrusion 154c thereof also stop. Thus, the first tray 150 can be fixed at the first position by the coupling protrusion 154c inserted between the first wall 155a and the second wall 155b. If the driving motor 180 continues to rotate from the position of the coupling protrusion 154c being between the first wall 155a and the second wall 155b, the coupling protrusion 154c also continues to rotate in the direction of arrow B to exit the locking rib 155 and makes contact on the outside of the fourth wall 155d of the locking rib 155, as depicted by the solid line of FIG. 17. Then, the coupling protrusion 154c presses against the fourth wall 155d and moves the first tray 150 forward toward the disk entrance 111 of the housing 110, as shown in FIG. 18. In the course of the forward movement of the first tray 150, the gear 154a of the first rotator 154 engages with the rack 153a of the first tray 150. As the tray driving motor 180 continues to rotate, the first rotator 154 continues to rotate by the friction force between the friction unit 154b and the friction member 182. Accordingly, the first tray 150 continues to move toward and eventually out of the housing 110 via the disk entrance 111 by the gear 154a and the rack 153a, as shown in FIG. 19.

With the first tray 150 protruding out of the housing 110, the disk seated in the disk seating unit 151 can be replaced by a new disk.

Figure 20:
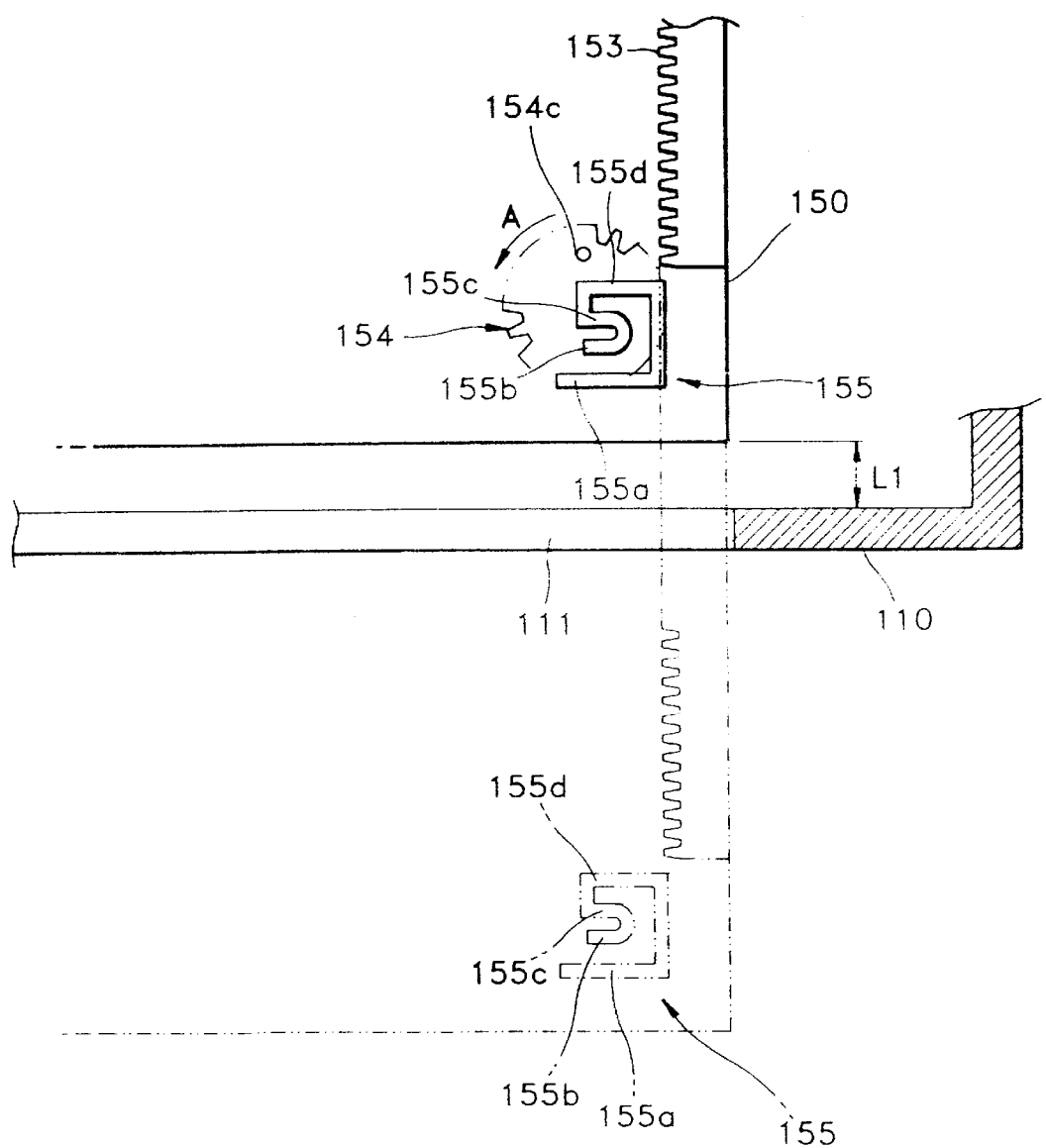
FIG. 20 is a structural plan view of important portions, sequentially showing the positional relationship between the locking rib of the first tray and the connecting protrusion of the first rotator when the first tray projected to the outside of the housing is moved back inside of the housing.

Thereafter, if the tray driving motor 180 is rotated in the reverse direction, the first rotator 154 rotates in the direction of arrow B by the friction force between the friction member 182 and the friction unit 154b of the first rotator 154. The first tray 150 having the rack 153a coupled to the gear 154a of the first rotator 154 is again moved back inside the housing 110 until the teeth of the gear 154a of the first rotator 154 and the rack 153a of the first tray 150 are no longer engaged, thereby positioning the first tray 150 at the first position, as depicted by the solid line of FIG. 20.

Then, the tray driving motor 180 rotates until the protrusion 154c of the first rotator 154 is inserted between the first wall 155a and the second wall 155b of the first tray 150 by being rotated in the direction of arrow A, as shown in FIG. 12. In the course of such operations, since the teeth of the gear 154a of the first rotator 154 and the rack 153a of the first tray 150 are no longer engaged, the first tray 150 remains at the first position. If the rotation of the tray driving motor 180 stops when the protrusion 154c is inserted between the first wall 155a and the second wall 155b, the first tray 150 will be fixed at the first position in spite of the external force against the first tray 150, the backward and forward movement of the first tray 150 being prevented by the walls of the locking rib 155.

Through the above-described procedure, a disk replacing operation is allowed such that a disk stored in the magazine can be extracted and replaced by a new disk to be loaded in the disk receiving shelf 121 within the magazine 120.

The raising and lowering operation of the magazine 120 will now be described in this embodiment. First, the tray driving motor 180 is rotated in the reverse direction to that for elevating the subtray 130. At this time, the rotational force of the tray driving motor 180 is transferred to the rotation cam plate 187 via the driving gear 181 and the train of gears 184, 185 and 186, and the slide member 188 is moved by the upper protrusion 188a inserted into the snail cam groove 187a of the rotation cam plate 187, as depicted by the solid line of FIG. 4. Accordingly, the rotating member 189 moves in the state depicted by the solid line of FIG. 4, as opposed to the operation of elevating the subtray 130, and the coupling gear 191 rotatably connected to the end of the rotation member 189 is geared with the first connecting gear 124, as depicted by the solid line of FIG. 4.

Then, if the elevating motor 190 installed in the rotation member 189 is rotated to rotate the coupling gear 191, the first connecting gear 124 and gear 123 connected thereto rotate and the screw stock 122 at which the gear 123 is fixed also rotates. The magazine 120 screw-coupled to the screw stock 122 is raised or lowered along the guide stock 122a according to the rotating direction of the screw stock 122, i.e., the rotating direction of the elevating motor 190.

As described above, while the subtray 130 is lowered and the disk D2 seated in the disk seating unit 161 of the second tray 160 is recorded or reproduced, the first tray 150 reciprocally moves between the first position and the second position or between the first position and the ejected position of the first tray 150 according to the rotation of tray driving motor 180. Thus, during disk recording or reproduction, the replacement of a disk within the magazine 120 can be performed, that is, a disk accommodated in a predetermined disk receiving shelf among the disk receiving shelves 121 within the magazine 120 can be extracted and replaced by a new disk in the predetermined disk receiving shelf.

If another disk mounted within the magazine 120 is to be reproduced or recorded after the completion of the disk reproduction or recording, the disk D2 seated in second tray 160 should be replaced with the other disk to be reproduced or recorded. For this purpose, tray driving motor 180 operates to connect the coupling gear 191 coupled to the rotating member 189 with the second connecting gear 192 to then reverse the rotating direction of the elevating motor 190 to the rotation direction thereof for elevating the subtray 130. Then, the rack member 195 returns to the back of the housing 110 through the train of gears 192, 193 and 194 and then the subtray 130 is lifted according to the movement of the rack member 195.

With the subtray 130 lifted, the recorded/reproduced disk D2 on the turntable 141 is seated in the disk seating unit 161 of the second tray 160, as shown in FIGS. 3 and 7, and the second tray 160 of the first position is transferred to the height of the disk entrance 111 of the housing 110. The friction member 182 coupled to the output shaft of the tray driving motor 180 makes contact with the friction unit 164b of the second rotator 164. In such a state, if the tray driving motor 180 is rotated, the second rotator 164 rotates by the friction force between the friction member 182 fixed on the output shaft of the tray driving motor 180 and the friction unit 164b of the second rotator 164.

Figure 21:
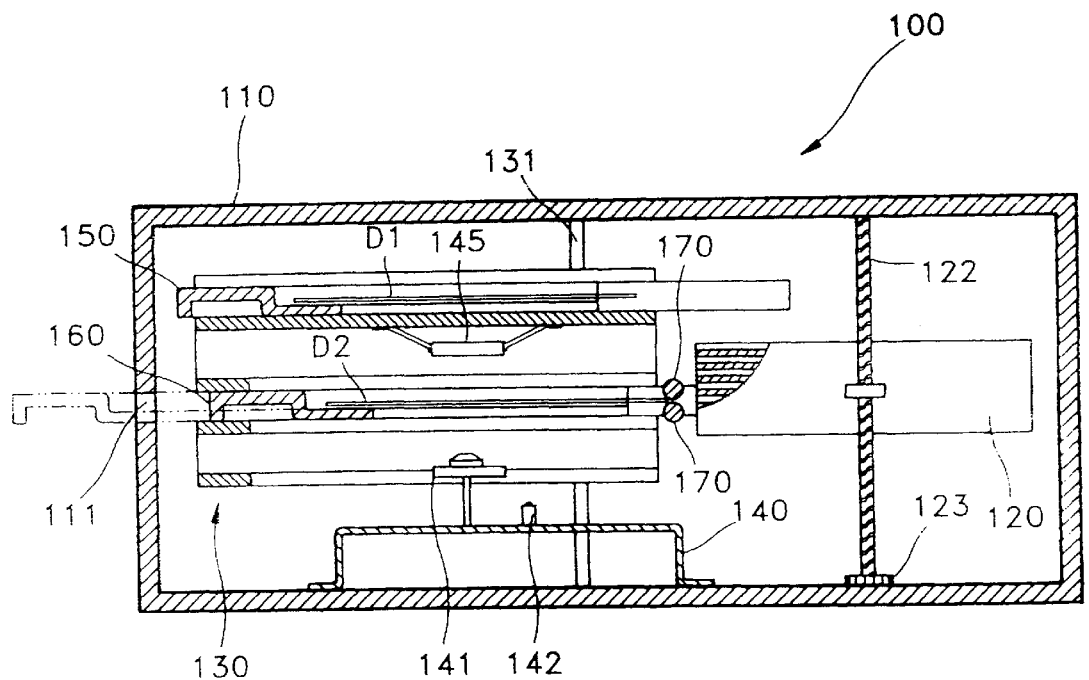
FIG. 21 is a schematic sectional view showing the second tray moved to the second position.

In the raised state of the subtray 130, the second tray 160 is moved to the second position where the disk D2 seated in the disk seating unit 161 is inserted between the rollers 170, as depicted by the solid line of FIG. 21. At this time, since the second tray 160 has the locking rib 165 having the same configuration as that of the locking rib 155 of the first tray 150 and the coupling protrusion 164c having the same configuration as that of the coupling protrusion 154c of the first rotator 154, the second tray 160 can be moved to the second position in the same manner as that of the first tray 150.

Since the disk D2 of the second tray 160 which is moved to the second position is inserted between the rollers 170, a new disk accommodated within the magazine 120 can be seated in the disk seating unit 161 of the second tray 160 in the same manner as the disk changing process of the first tray 150, thereby completing the disk changing operation.

After the operation of changing disks of the second tray 160 is completed, the second tray 160 returns to the first position. In such a state, if the subtray 130 is lowered, a new disk is supported on the turntable 141 to then be reproduced or recorded.

As described above, the second tray 160 includes the rack 163a having the same configuration as that of the rack 153a of the first tray 150 and the second rotator 164 having the same configuration as that of the first rotator 154. Also, the gear 164a of the second rotator 164 is geared with the rack 163a of the second tray 160. Thus, in the raised state of the subtray 130, the second tray 160 may protrude to the outside of the housing 110 via the disk entrance 111 by the friction force between the friction unit 164b of the second rotator 164 and the friction member 182 and the engaging of the teeth of the gear 164a and the rack 163a, according to the rotation of the tray driving motor 180, as depicted by the dashed line of FIG. 21.

Therefore, when a disk is not being recorded or reproduced, a disk accommodated in any disk receiving shelf among the disk receiving shelves 121 of the magazine 120 can be replaced with a new one by the second tray 160 which can be inserted into/ejected from the disk entrance 111 of the housing 110 by the tray transferring means in the raised state of the subtray 130.

In the above-described embodiment, one of the first tray 150 and the second tray 160 is selected and horizontally moved by the tray driving motor 180 installed in the housing 110. However, for example, a motor for horizontally moving the first tray 150 forward and backward with respect to the housing 110 and a motor for horizontally moving the second tray 160 forward and backward with respect to the housing 110 may be separately installed on the subtray 130.

Also, in the above-described embodiment, according to the rotating direction of the tray driving motor 180, the coupling gear 191 rotatably coupled to the rotating member 189 is connected to the first connecting gear 124 or the second connecting gear 192 and the elevating motor 190 installed in the rotating member 189 is rotated, thereby selectively elevating the subtray 130 or the magazine 120.

Figure 22:
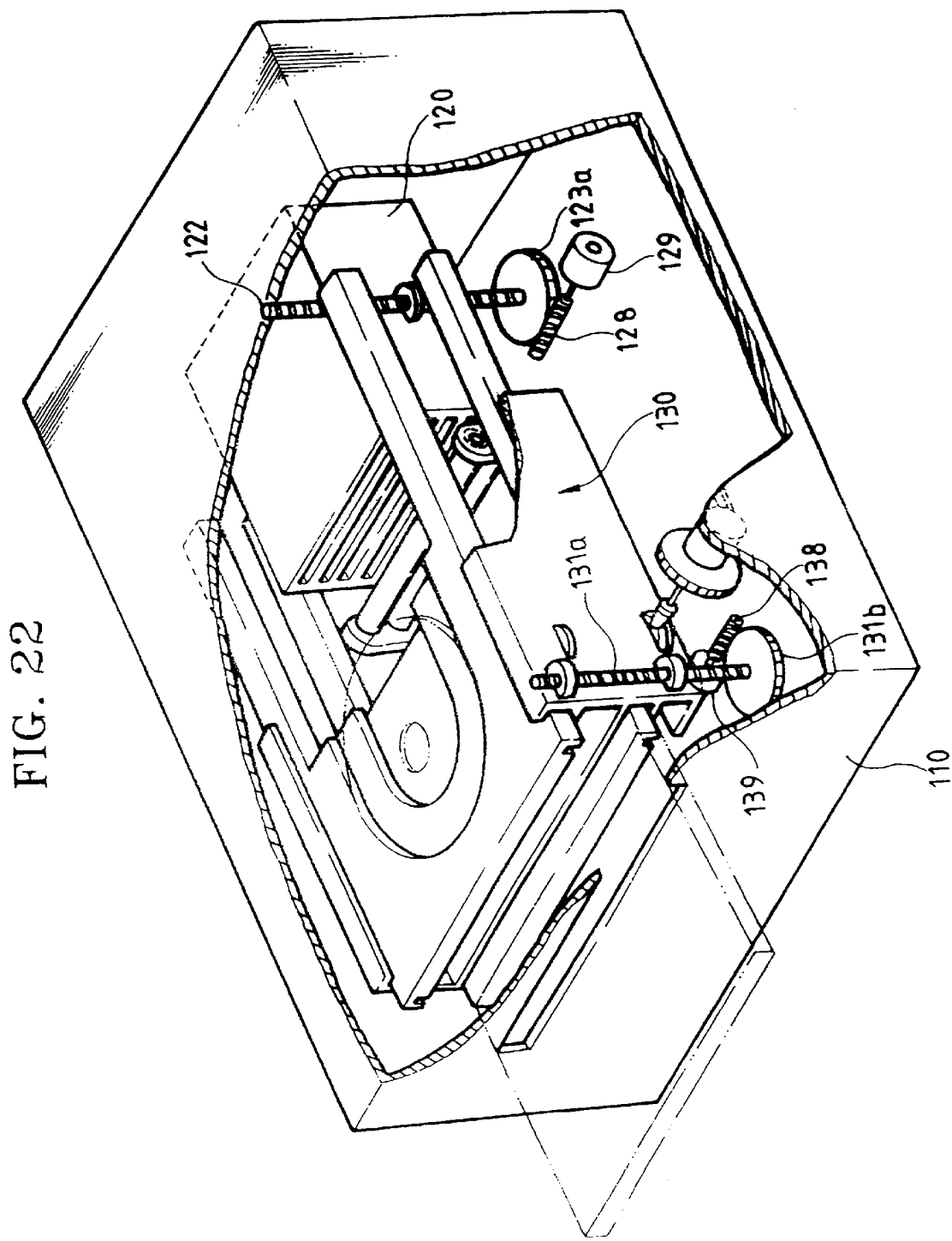
FIG. 22 is a schematic perspective view of another embodiment of the present invention.

However, in another embodiment, the magazine 120 and the subtray 130 may be elevated independently. For instance, means for elevating the subtray 130 and means for elevating the magazine 120 may be constructed separately, as shown in FIG. 22. In other words, the magazine elevating means is constituted by a first worm gear 123a fixedly inserted onto the screw stock 122 and a first motor 129 fixed on the housing 110 and having a first worm 128 engaged with the first worm gear 123a at its output shaft. The subtray elevating means is constituted by an auxiliary screw stock 131a rotatably coupled to the housing 110 and screw-coupled to the subtray 130, a second worm gear 131b fixedly inserted onto the auxiliary screw stock 131a and a second motor 139 fixed on the housing 110 and having a second worm 138 engaged with the second worm gear 131b at its output shaft.

In such an embodiment, when the first motor 129 rotates, the rotation force is transmitted to the screw stock 122 via the first worm 128 and the first worm gear 123a coupled thereto to rotate the screw stock 122, thereby lifting or lowering the magazine 120. Also, when the second motor 139 rotates, the rotational force is transmitted to the auxiliary screw stock 131a via the second worm 138 and the second worm gear 131b coupled thereto to rotate the auxiliary screw stock 131a, thereby raising or lowering the subtray 130.

Figure 2:
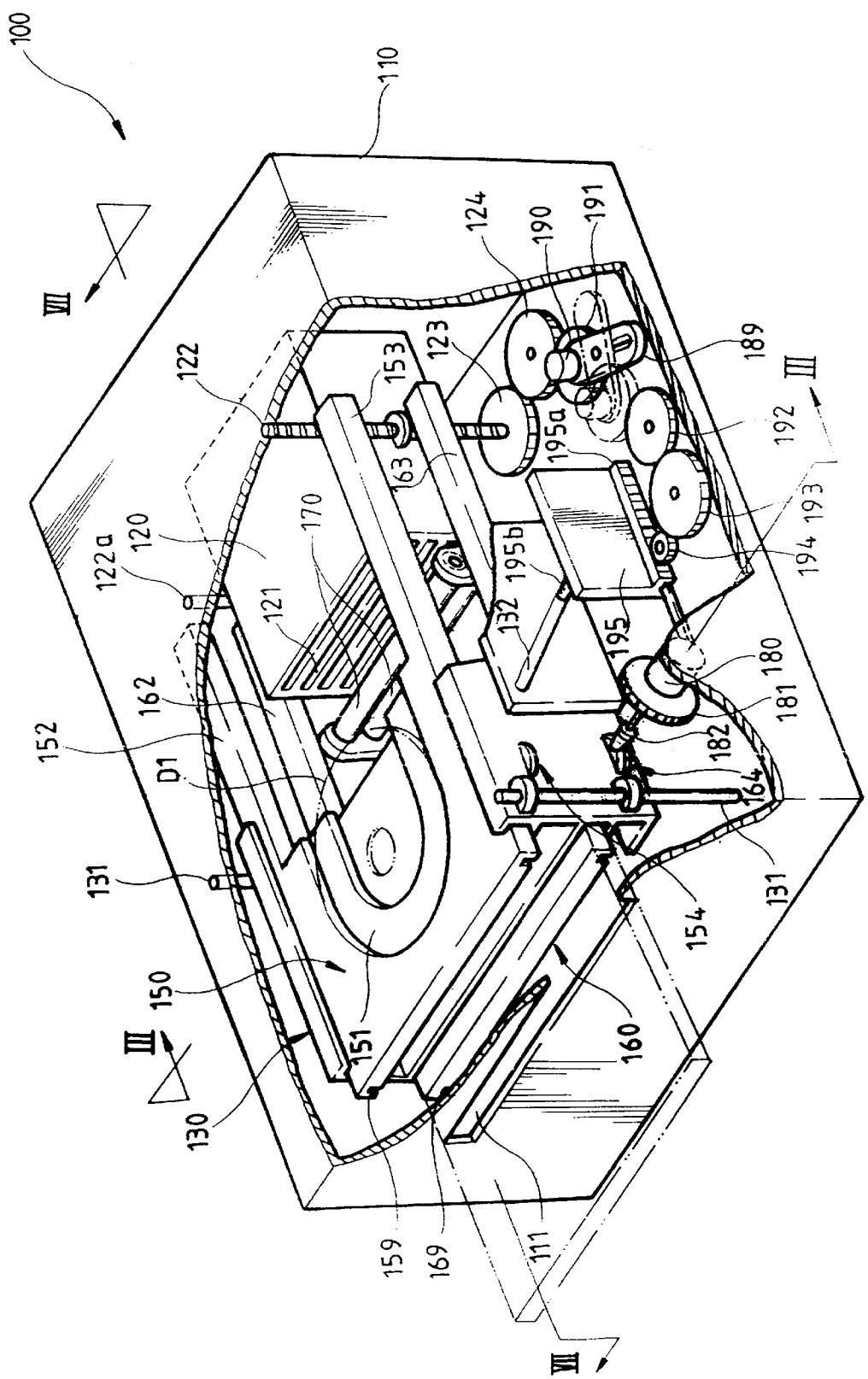
FIG. 2 is a schematic perspective view of a disk recording/reproducing apparatus according to the present invention.

In the disk recording/reproducing apparatus 100 described with reference to FIG. 2, the rack 153a of the first tray 150 extends from the end of the guide 153 adjacent to the portion where the locking rib 155 is formed. When the first rotator 154 rotates, the first tray 150 is inserted into or extracted from the disk entrance 111 of the housing 110 and is movable to the second position by the engagement of the rack 153a with gear 154a and the engagement of the locking rib 155 with the coupling protrusion 154c. However, the rack 153a beneath the first tray 150 may be further extended to the front of the first tray 150 with only the gear 154a of the first rotator 154 engaged to the rack 153a of the first tray 150 without the engagement of the locking rib 155 with the coupling protrusion 154c, to then be moved to the second position and the position where the first tray 150 protrudes out of the disk entrance 111.

Also, the second tray 160 may be moved to the second position and the position where the second tray 160 protrudes out of the disk entrance 111 only with the engagement of the gear 164a of the second rotator 164 with the rack 163a of the second tray 160 by further extending the rack 163a beneath the second tray 160 to the front of the second tray 160.

In the embodiments having been described above, the first tray 150 and second tray 160 are movably installed between the first position and the second position. However, as in conventional apparatuses, only one tray may be installed between the first and second positions.

Although specific embodiments of the present invention have been shown and described, it will be understood that various modifications may be made without departing from the spirit and scope of the present invention.

As described above, in the disk recording/reproducing apparatus according to the present invention, disks mounted in a magazine can be replaced even while a disk is being reproduced or recorded.

What is claimed is:

1. A disk recording/reproducing apparatus comprising:
   a housing including a front wall having a disk entrance therein;
   a magazine having a plurality of disk receiving shelves and being elevatably installed within said housing;
   a deck fixed on said housing and on which a turntable, where a disk is seated, and an optical pickup are mounted;
   a subtray elevatably installed above said deck;
   a tray having a disk seating unit thereon and slidably supported by said subtray to be movable horizontally forward and backward with respect to said housing;
   a pair of rollers rotatably installed between said magazine and said tray, said rollers extending in parallel with respect to said disk receiving shelves and operative to pressingly transfer a disk inserted therebetween to a predetermined position, said rollers directly contacting upper and lower planar surfaces of the disk inserted therebetween;
   said tray being raised or lowered at a first position where a disk seated on said disk seating unit is spaced apart from said rollers;
   tray position changing means for horizontally moving said tray from said first position to a second position where the disk seated on said disk seating unit is inserted between said rollers; and
   means for locking said tray at said first position and said second position,
      wherein said tray position changing means includes:
      a rotator installed on said subtray and having a coupling protrusion at a position near an edge of said rotator;
      a driving source for rotating said rotator; and
      a first wall and a fourth wall protruding underneath said tray and disposed parallel to each other spaced a distance apart from each other which is smaller than a rotational diameter of said coupling protrusion,
      wherein said coupling protrusion is inserted between said first wall and said fourth wall by the rotation of said rotator when said tray is positioned at said first position, said coupling protrusion pressing against said fourth wall thereby moving said tray to said second position by the rotation of said rotator in one direction, and said coupling protrusion pressing against said first wall thereby moving said tray to said first position by the rotation of said rotator in the other direction, and
      wherein said tray locking means includes a second wall and a third wall formed in parallel between said first and fourth walls of said tray, said coupling protrusion being inserted between said first wall and said second wall to limit the movement of said tray when said tray is positioned at said first position, and said coupling protrusion being inserted between said third wall and said fourth wall to limit the movement of said tray when said tray is positioned at said second position.

2. The disk recording/reproducing apparatus as claimed in claim 1, wherein said rotator comprises a gear on one side and a friction unit on an opposite side, and wherein said driving source comprises a motor having an output shaft with a friction member mounted thereon, said friction member being operative to contact said friction unit of said rotator.

3. The disk recording/reproducing apparatus as claimed in claim 2, wherein said friction member is made of rubber.

4. The disk recording/reproducing apparatus as claimed in claim 2, wherein said tray includes a rack which is operative to mesh with said gear of said rotator.

5. A disk recording/reproducing apparatus comprising:
   a housing including a front wall having a disk entrance therein;
   a magazine having a plurality of disk receiving shelves and being elevatably installed within said housing;
   a deck fixed on said housing and on which a turntable, where a disk is seated, and an optical pickup are mounted;
   a subtray elevatably installed above said deck;
   a tray having a disk seating unit thereon and slidably supported by said subtray to be movable horizontally forward and backward with respect to said housing;
   a pair of rollers rotatably installed between said magazine and said tray and operative to pressingly transfer a disk inserted therebetween to a predetermined position;
   said tray being raised or lowered at a first position where a disk seated on said disk seating unit is spaced apart from said rollers;
   a tray position changing mechanism which horizontally moves said tray from said first position to a second position where the disk seated on said disk seating unit is inserted between said rollers; and a tray locking mechanism operative to lock said tray at said first position and said second position, wherein said tray position changing mechanism includes:

a rotator installed on said subtray and having a coupling protrusion at a position near an edge of said rotator;

a driving source for rotating said rotator; and a first wall and a fourth wall protruding underneath said tray and disposed parallel to each other spaced a distance apart from each other which is smaller than a rotational diameter of said coupling protrusion, wherein said coupling protrusion is inserted between said first wall and said fourth wall by the rotation of said rotator when said tray is positioned at said first position, said coupling protrusion pressing against said fourth wall thereby moving said tray to said second position by the rotation of said rotator in one direction, and said coupling protrusion pressing against said first wall thereby moving said tray to said first position by the rotation of said rotator in the other direction, and wherein said tray locking mechanism includes a second wall and a third wall formed in parallel between said first and fourth walls of said tray, said coupling protrusion being inserted between said first wall and said second wall to limit the movement of said tray when said tray is positioned at said first position, and said coupling protrusion being inserted between said third wall and said fourth wall to limit the movement of said tray when said tray is positioned at said second position.

6. The disk recording/reproducing apparatus as claimed in claim 5, wherein said rotator comprises a gear on one side and a friction unit on an opposite side, and wherein said driving source comprises a motor having an output shaft with a friction member mounted thereon, said friction member being operative to contact said friction unit of said rotator.

7. The disk recording/reproducing apparatus as claimed in claim 6, wherein said friction member is made of rubber.

8. The disk recording/reproducing apparatus as claimed in claim 6, wherein said tray includes a rack which is operative to mesh with said gear of said rotator.

* * * * *